(12) United States Patent
Hurley et al.

(10) Patent No.: US 9,888,058 B2
(45) Date of Patent: Feb. 6, 2018

(54) SENDING FILES FROM ONE DEVICE TO ANOTHER DEVICE OVER A NETWORK

(71) Applicant: Apple Inc., Cupertino, CA (US)

(72) Inventors: Timothy S. Hurley, Los Gatos, CA (US); Guido Neitzer, Sunnyvale, CA (US); Joshua B. Dickens, Menlo Park, CA (US); John K. Herbold, Los Altos, CA (US); Patrice O. Gautier, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/043,225

(22) Filed: Feb. 12, 2016

(65) Prior Publication Data

US 2016/0164950 A1    Jun. 9, 2016

Related U.S. Application Data

(63) Continuation of application No. 13/248,182, filed on Sep. 29, 2011, now Pat. No. 9,294,546.

(Continued)

(51) Int. Cl.
*G06F 15/16* (2006.01)
*H04L 29/08* (2006.01)
*G06F 17/30* (2006.01)

(52) U.S. Cl.
CPC ........ *H04L 67/06* (2013.01); *G06F 17/30165* (2013.01); *H04L 67/18* (2013.01);
(Continued)

(58) Field of Classification Search
CPC .............................................. G06F 17/30165
(Continued)

(56) References Cited

U.S. PATENT DOCUMENTS 6,556,217 B1    4/2003  Makipaa
2002/0046232 A1    4/2002  Adams
(Continued)

FOREIGN PATENT DOCUMENTS

JP    2003196076    7/2003
JP    2004326281 A    11/2004
(Continued)

OTHER PUBLICATIONS

DropBox [retrieved on May 19, 2014]. Retrieved from the Internet. <URL:http://web.archive.org/web/20110207222152/http://www.dropbox.com/features> published on Feb. 7, 2011 as per Wayback Machine.
(Continued)

*Primary Examiner* — Hamza Algibhah
(74) *Attorney, Agent, or Firm* — Blank Rome LLP (57) ABSTRACT

Techniques are provided for causing a file to be sent from a source device over a network to one or more destination devices. An intermediary receives a notification of a file and determines which destination device(s) are to retrieve the file. The intermediary may determine the destination device(s) based on one or more attributes of the file. The intermediary may cause the file to be stored in persistent storage that is maintained by a separate storage service. The intermediary may cause the file to be deleted after a particular period of time. The source device may send multiple versions of a file to the intermediary, which determines which destination device is to receive which version. The file may be a digital image and a destination device may be a device that displays a slideshow of digital images while the destination device receives the digital image over a network.

19 Claims, 5 Drawing Sheets

Related U.S. Application Data (60) Provisional application No. 61/493,214, filed on Jun. 3, 2011.

(52) U.S. Cl.
CPC .......... *H04L 67/26* (2013.01); *H04L 67/2814* (2013.01); *H04L 67/2857* (2013.01); *H04L 67/306* (2013.01); *H04L 67/2823* (2013.01); *H04L 67/303* (2013.01)

(58) Field of Classification Search
USPC ........................................................ 709/219
See application file for complete search history.

(56) References Cited

U.S. PATENT DOCUMENTS

| | | | |
|---|---|---|---|
| 2003/0072488 | A1 | 4/2003 | Barsness |
| 2003/0233541 | A1 | 12/2003 | Fowler |
| 2004/0243671 | A9 | 12/2004 | Needham |
| 2006/0036610 | A1 | 2/2006 | Wang |
| 2006/0200534 | A1 | 9/2006 | Nagai |
| 2006/0230030 | A1 | 10/2006 | Volpa |
| 2006/0236049 | A1 | 10/2006 | Iwamura |
| 2008/0126437 | A1 | 5/2008 | Chiba |
| 2008/0154983 | A1 | 6/2008 | Lee |
| 2008/0288574 | A1 | 11/2008 | Sammarco |
| 2009/0037519 | A1 | 2/2009 | Young |
| 2009/0037520 | A1* | 2/2009 | Loffredo ...................... 709/203 |
| 2009/0046954 | A1 | 2/2009 | Ishii |
| 2009/0138481 | A1* | 5/2009 | Chatley et al. ................ 707/10 |
| 2009/0150562 | A1 | 6/2009 | Kim |
| 2009/0151006 | A1 | 6/2009 | Saeki |
| 2009/0234912 | A1* | 9/2009 | Perrine et al. ................ 709/203 |
| 2009/0265431 | A1* | 10/2009 | Jania .................... G06Q 10/107 709/206 |
| 2010/0162414 | A1 | 6/2010 | Medvinsky |
| 2010/0235878 | A1* | 9/2010 | Lim et al. ......................... 726/1 |
| 2010/0250885 | A1 | 9/2010 | Nakata |
| 2011/0060777 | A1* | 3/2011 | Van De Poel ................ 707/827 |
| 2011/0219108 | A1* | 9/2011 | Lisiecki et al. ............... 709/223 |
| 2011/0298689 | A1* | 12/2011 | Bh+e et al. ..................... 345/1.1 |
| 2012/0330887 | A1 | 12/2012 | Young |
| 2013/0097284 | A1* | 4/2013 | Bai et al. ...................... 709/217 |
| 2013/0117373 | A1 | 5/2013 | Umehara |
| 2013/0124546 | A1 | 5/2013 | Wormley |

FOREIGN PATENT DOCUMENTS

| | | |
|---|---|---|
| JP | 2005242613 | 9/2005 |
| JP | 2006134073 | 5/2006 |
| JP | 2009032266 A | 2/2009 |
| JP | 2009207133 | 9/2009 |
| JP | 2009266254 A | 11/2009 |
| WO | 2008146397 | 2/2008 |
| WO | 2011031413 A1 | 3/2011 |

OTHER PUBLICATIONS

European Search Report and Search Opinion for EP Application No. 12170484.5-2413, dated Sep. 21, 2012, 9 pages.
Examination Report from corresponding AU Application No. 2012202165, dated Mar. 26, 2013.
First Office Action received in KR Application No. 10-2012-0059267, dated Oct. 8, 2013.
First Office Action received in MX Application No. MX/a/2012/006424, dated Sep. 26, 2013.
Office Action received in corresponding JP Application No. 2012-138206, dated Jun. 21, 2013.
Perez, Sarah, "Facial Recognition Comes to Facebook," Mar. 24, 2009, printed from www.readwrite.com on Oct. 22, 2012, 12 pages.

* cited by examiner

SENDING FILES FROM ONE DEVICE TO ANOTHER DEVICE OVER A NETWORK

CROSS-REFERENCE TO RELATED APPLICATIONS; BENEFIT CLAIM

This application is a continuation of U.S. application Ser. No. 13/248,182, filed Sep. 29, 2011, which claims the benefit of U.S. Provisional Application No. 61/493,214, filed Jun. 3, 2011, the entire contents of both of which are hereby incorporated by reference in their entireties.

FIELD OF THE INVENTION

The present invention relates to the automatic pushing digital items, such as digital photos, from one computing device to another computing device over a network.

BACKGROUND

It is increasingly common for a person to own multiple computing devices, such as a smart phone, a desktop computer, and a laptop computer. Many people that own multiple devices desire to have at least some of their files to be stored on each of their devices. One approach to accomplish this is for a user to email a file from one of her devices (the "source" device) to an online account, such as an email account. Then, the user operates another of her devices (or "destination" device) to access the online account and initiate the download of that file to the destination device. The user performs this series of steps for each of her destination devices.

Another approach is to physically connect two devices (for example, via a USB ports on the respective devices) and instruct the destination device to access the source device and retrieve a copy of the file from the source device. The user would have to perform this series of steps for each of her destination devices.

Both approaches require significant and laborious user interaction. Also, to the extent that the user wishes for a file to be transferred to multiple destination devices, both approaches require repetitive (or at least very similar) steps, such as accessing an online account or connecting two devices with a (e.g., USB) cord. Furthermore, both approaches require the user to physically handle and operate each of her destination devices.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A user is able to cause a file that is stored at one device (a "source" device) to be sent to one or more other devices ("destination" devices) over a network, without having to perform any particular operation at the destination devices to obtain the file at the destination devices once the file is sent from the source device. One or more intermediary devices are used to receive the file from the source device, identify one or more destination devices that are to receive the file, and send the file to the one or more destination devices. Thus, a physical connection between the source device and the one or more destination devices is not required.

In one embodiment, after obtaining a copy of the file from the source device, the intermediary stores a temporary copy of the file. By storing a temporary copy of the file at the intermediary, the destination devices need not be available to receive the file at the same time that the source device is available to deliver the file. For example, the intermediary may obtain a copy of the file from the source device while the destination devices are unavailable to the intermediary, and may push the file to the destination devices when the source device is not available to the intermediary. In one embodiment, one intermediary service is responsible for identifying and notifying the destination devices while another intermediary service is responsible for storing the temporary copy of the file.

Thus, the file (or a copy thereof) is stored remote to the source device and the destination devices, at least temporarily, until each of the destination devices retrieves the copy or some other deletion criteria is satisfied. For example, in one approach, the temporary copy of the file is deleted or made inaccessible at the remote storage after the temporary copy has been stored a certain period of time, even if not all of the destination devices received the file.

In one approach, multiple versions of a file are sent from a source device to be stored remotely. An intermediary entity determines which destination device receives which version. Thus, one destination device might receive a first version of a file (e.g., without ever receiving a second version of the same file) and another destination device might receive the second version of the file (e.g., without ever receiving the first version of the file)

In one approach, an attribute of a file (from a source device) is used to determine which destination devices are to receive the file. For example, the identity of person detected in a digital image may be used to determine that the digital image should be sent to a particular set of one or more destination devices.

In one approach, a digital image that is sent, over a network, from a source device is sent to a destination device while the destination device is playing a slideshow. The digital image is added to the slideshow while the destination device is displaying the slideshow, without interrupting the slideshow.

System Overview

Figure 1:
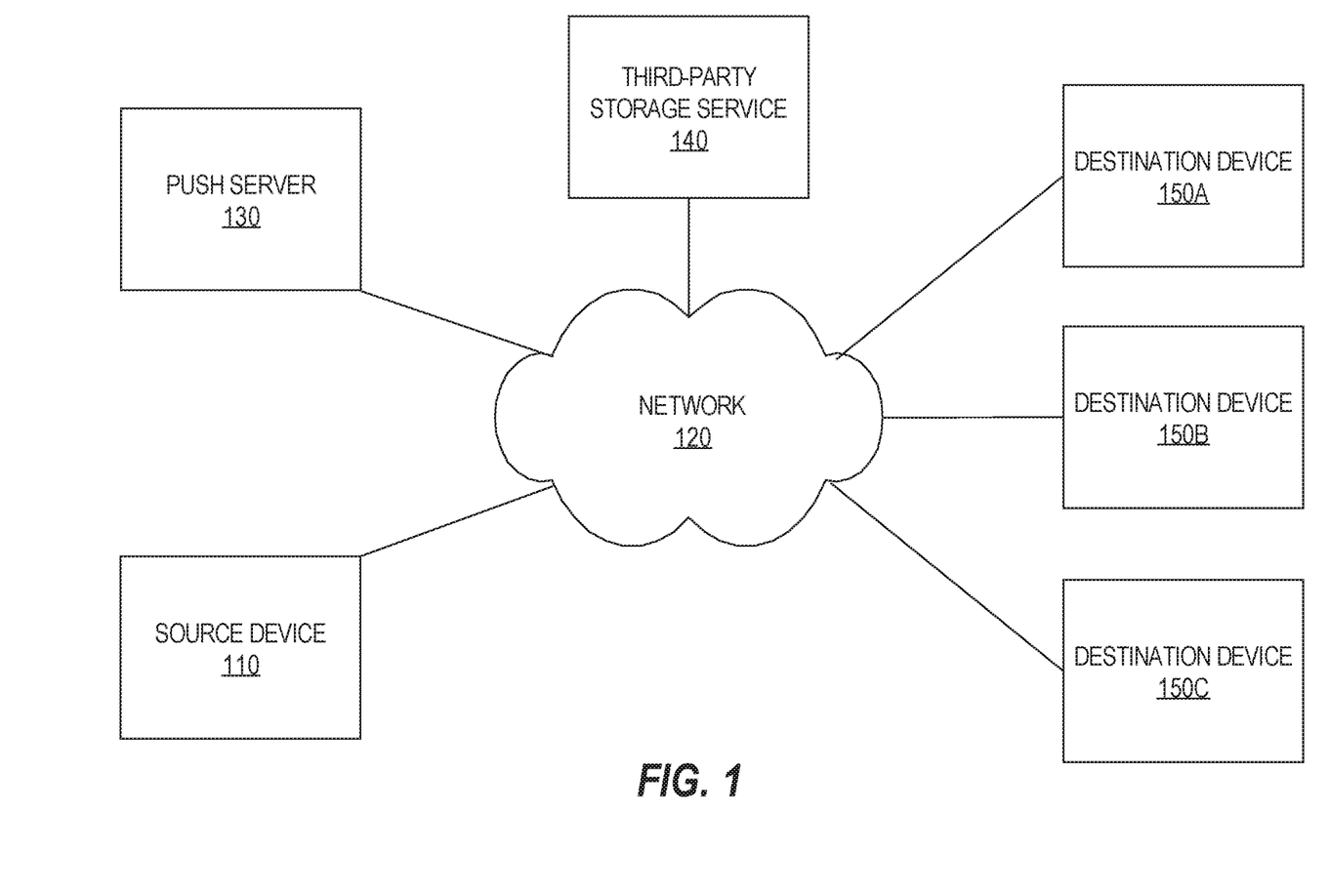
FIG. 1 is a block diagram that depicts an example system for pushing files that originate from one device to one or more other devices, according to an embodiment of the invention.

FIG. 1 is a block diagram that depicts an example system for causing files that originate from one computing device to be sent to one or more other computing devices, according to an embodiment of the invention. FIG. 1 depicts the following elements: source device 110, network 120, push server 130, third-party storage service 140, and destination devices 150A-C. In a related embodiment, there is no third-party storage service 140. Instead, the functionality of third-party storage service 140 (described hereinafter) is performed by push server 130.

Source device 110 and destination devices 150A-C are computing devices that are able to communicate with push server 130 over network 120. Non-limiting examples of source device 110 and destination devices 150A-C include desktop computers, laptop computers, tablet computers, smart phones, PDAs, and other electronic handheld devices. Also, embodiments of the invention are not limited to the particular communication protocol that is used to transfer data and messages between source device 110 and push server 130 and between push server 130 and destination devices 150A-C. A non-limiting example of a communication protocol that may be employed by the entities depicted in FIG. 1 is Hypertext Transfer Protocol (HTTP).

For simplicity, only one source device and only three destination devices are depicted in FIG. 1. However, there may be more or fewer (but at least one) destination devices that each receives a copy of a file that source device 110 sends over network 120 to be stored by third-party storage service 140 (or by push server 130). Also, push server 130 is configured to support many source devices, each of which may be associated with a different set of destination devices.

In an embodiment, a source device (e.g., source device 110) sends a file over network 120 to be stored by third-party storage service 140 (or by push server 130) even though the source device is not associated with any destination devices. For example, no destination device may have registered (e.g., with push server 130) to receive files transmitted from the source device or the source device may not have registered (e.g., with push server 130) any destination device as a receiver of files sent by the source device. However, after one or more files sent by the source device are stored by third-party storage service 140 (or by push server 130), a destination device becomes registered to receive files from the source device. Subsequently, push server 130 causes the one or more files (that are stored by third-party storage service 140 or by push server 130) to be sent to the destination device. In this way, one or more files may be accumulated in "the cloud" without requiring a destination device to be registered to receive those files at the time those files are transmitted by the source device.

Source device 110 is configured to send messages over network 120. At least some of the messages include files. Some of the messages may comprise notifications, received by push server 130, that one or more files are to be uploaded (or sent) from source device 110. The files may be of any type. Non-limiting examples of types of files include image files, executable files, word processing files, text files, music files, and video files. Further, each file of each file type may be in one of many different types of formats. For example, image file formats may include JPEG, TIFF, RAW, PNG, GIF, BMP, and WebP.

Destination devices 150A-C are configured to receive and store a file that was transmitted from source device 110. In one embodiment, destination devices 150A-C have software for consuming various types of files. For example, if the file is an image file, then destination devices 150A-C may have software capable of displaying the corresponding image on a display screen. If the file is a video file, then destination devices 150A-C may have software for playing the corresponding video.

Transmission of Messages from the Source Device

According to one embodiment, source device 110 is configured to automatically transmit messages over network 120 in response to detecting that certain events occur. A device is said be "configured" to perform an action if the device executes software that is capable of performing the action. The events that cause source device 110 to automatically send messages to push server 130 are referred to therein as message-triggering events.

The specific message-triggering events may vary from implementation to implementation. For example, in one embodiment, generation of a new digital image on the source device 110 is a message-triggering event. In such an embodiment, the source device 110 is configured to transmit a message to push server 130 in response to detecting that a new digital image is present on source device 110. A new image may be detected, for example, by detecting when a camera that is built into source device 110 has taken a picture.

In another embodiment, establishing a certain type of connection after a new file has been generated at the source device 110 may be a message-triggering event. For example, assume that source device 110 is mobile phone capable of communicating over the Internet using an Edge connection, a 3G connection, and a Wi-Fi connection. In such an embodiment, establishing a Wi-Fi connection with the Internet after one or more new images have been created on source device 110 may automatically trigger source device to send a message to push server 130 over the Wi-Fi connection. The message may indicate, for example, that one or more new files are to be uploaded, to be re-transmitted to destination devices 150A-C.

The following is a non-limiting list of message-triggering events that cause a message to be automatically sent from source device 110 to the push server 130:

while the source device 110 has any connection to the push server 130, a new file of a particular file type is created on source device 110;
 while the source device 110 has any connection to the push server 130, a file of a particular type is moved to a particular directory on source device 110;
 while the source device 110 has any connection to the push server 130, a file of a particular type is tagged with a particular tag on source device 110;
 while the source device 110 has any connection to the push server 130, a new destination device is designated;

while the source device 110 has a first type of connection to the push server 130, a second type of connection is established between the source device 110 and the push server 130;

after the source device 110 has been disconnected with the push server 130, a connection of any type is established between the source device 110 and the push server 130.

These are merely some examples of the various message-triggering events that may be used to initiate the process that causes temporary copies of files to be automatically pushed from the source device 110 to the storage service 140.

Destination Device Notification

According to one embodiment, destination devices 150A-C are notified by push server 130 of a file that is destined for destination devices 150A-C. As mentioned above, such notification may occur asynchronously relative to the transmission of the file to the intermediary storage. For example, the notification may occur in response to push server 130 detecting that a destination device has established a connection with the push server, which may occur some time after a copy of the file was transferred from the source device 110 to the intermediary. In embodiments where the intermediary stores a temporary copy of the file, the notification may occur even during a period in which the source device 110 is itself offline.

The notification from push server 130 may include the file itself. Alternatively, the notification may include storage location data that indicates where the file is stored. In response to receiving a notification, each of destination devices 150A-C sends, to the appropriate storage service (e.g., third-party storage service 140), a request that includes the storage location data or data that identifies the file. Third-party storage service 140 uses the storage location data or file identifier (in the request) to locate the file and send the file to the destination device that sent the request. Thus, a user of a destination device may not be required to perform any actions (other than having his destination device powered on) in order to receive a file from a source device.

Encryption

In one embodiment, files sent from source device 110 for retransmission to destination device 150A-C are encrypted prior to being stored at the third-party storage service 140. The encryption may be performed by source device 110 or by push server 130. Any technique for encrypting files may be used. Also, any key used to perform encryption and decryption may be used. Non-limiting examples of an encryption key to encrypt the one or more files include data about source device 110, data about the user of source device 110, or data about the user's password.

In order to decrypt the one or more encrypted files, destination devices 150A-C (or push server 130) would need access to the encryption key. Thus, in one embodiment, push server 130 sends the encryption key to destination devices 150A-C when the destination devices receive the encrypted files from the third-party storage service 140. Alternatively, destination devices 150A-C may already have access to the encryption key, which may have been stored at destination devices 150A-C prior to the one or more files being encrypted. In either scenario, while encrypted files are stored at third-party storage service 140, the encrypted files cannot be decrypted by storage service 140 or another entity that might gain unauthorized access to the encrypted files while the encrypted files are stored by storage service 140.

Network

Communication between push server 130 and source device 110, third-party storage service 140, and destination devices 150A-C is made possible via network 120. Network 120 may be implemented by any medium or mechanism that provides for the exchange of data between various computing devices. Examples of such a network include, without limitation, a network such as a Local Area Network (LAN), Wide Area Network (WAN), Ethernet or the Internet, or one or more terrestrial, satellite, or wireless links. The network may include a combination of networks such as those described. The network may transmit data according to Transmission Control Protocol (TCP), User Datagram Protocol (UDP), and/or Internet Protocol (IP).

Push Server and Third-Party Storage Service

Figure 2:
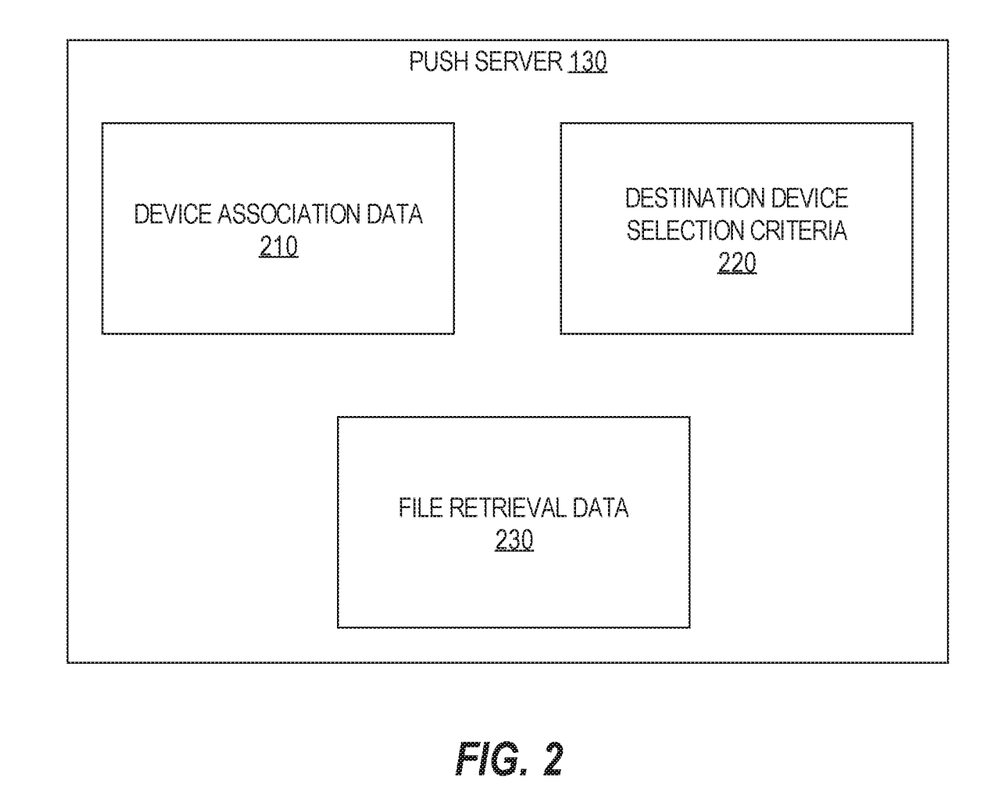
FIG. 2 is a block diagram that depicts different types of data that is maintained by an intermediary that manages the storage of files received from source devices and the notification of those files to destination devices, according to an embodiment of the invention.

Push server 130 is responsible for ensuring that files transmitted from source device 110 are stored remotely (relative to source device 110 and destination devices 150A-C) and eventually sent to one or more of destination devices 150A-C. In other words, push server 130 (in conjunction with third-party storage service 140) acts as a remote cache to which files are pushed from source device 110 and from which files are pushed to destination devices 150A-C. To this end, push server 130 maintains certain types of data that are depicted in FIG. 2.

Push server 130 is configured to receive notifications from source device 110 that one or more files are to be transmitted from source device 110. In response to such a notification, push server 130 sends, to source device 110, storage location data that indicates where the one or more files are to be sent. The storage location data may be data associated with third-party storage service 140. Source device 110 uses the storage location data to transmit the one or more files to third-party storage service 140.

For example, the storage location data that is sent from push server 130 to source device 110 may comprise a Uniform Resource Locator (URL). The URL may include one or more values, generated by push server 130, that are associated with the one or more files that are to be sent from source device 110. The one or more values may be file identifiers that uniquely identify one or more files relative to all other files that source device 110 (and/or other source devices) sends to third-party storage server 140. Those values may be stored by third-party storage service 140 in association with the one or more files. Later, third-party storage service 140 receives, from one of destination devices 150A-C, a request that includes the one or more values. Third-party storage service 140 uses the one or more values to identify the corresponding one or more files, which third-party storage service 140 sends to the destination device.

Third-Party Storage Service

Third-party storage service 140 is a storage service with which the entity that operates push server 130 contracts to provide the storage of files that are sent from source device 110 (and other source devices not depicted in FIG. 1). Thus, while push server 130 maintains information about files transmitted from source device 110 and where those files are to be transmitted (or pushed), third-party storage service 140 merely stores the files. Third-party storage service 140 stores data that associates an identifier for a file with a location in persistent storage maintained by third-party storage service 140. Then, when third-party storage service 140 receives a request for a file and the request includes an identifier, third-party storage service 140 uses the identifier to determine where the file is stored. Third-party storage service 140 reads the file from storage and sends the file to the requester (i.e., one of destination devices 150A-C).

In an embodiment where third-party storage service 140 is not part of the system, source device 110 sends the file to push server 130, which would then be responsible for storing the file. Thus, in this embodiment, it is not necessary for push server 130 to generate and send storage location data to source device 110 or to any of destination devices 150A-C.

Device Association Data

According to FIG. 2, push server 130 stores device association data 210, destination device selection criteria 220, and file retrieval data 230. Device association data 210 associates source device 110 with destination devices 150A-C. Device association data 210 may be logically organized on a per-source device basis. For example, device association data 210 may comprise a set of entries (e.g., in a table), where each entry associates a source device with one or more destination devices. Each entry may comprise two fields: a source device field and a destination device(s) field. An index may be created based on the source device field to allow for relatively fast access to the appropriate entries.

The association between two devices may be unilateral or bilateral. In a unilateral association, certain files created at a first device are automatically pushed to a second device, but the same type of filed created at the second device are not automatically pushed to the first device. In a bilateral association, files created at each of the first and second devices are pushed to the other of the first and second devices. Further, a single source device may have unilateral associations with some devices, and bilateral associations with other devices.

In one embodiment, each entry within device association data 210 may simply indicate multiple devices. Thus, each entry may need to be examined in order to identify an identifier for the appropriate source device. Once an identifier for the source device is located, the other device identifier(s) in the entry is used to identify the corresponding destination device(s).

Device association data 210 may be established by a user of source device 110 or of one of destination devices 150A-C, if the users are different. The user may operate one of source device 110 or destination devices 150A-C (or another device) to establish device association data 210 and cause that device to send device association data 210 to push server 130. Device association data 210 may be updated based on user input at any time from any device.

Alternatively, device association data 210 may be established by push server 130 when push server 130 detects that source device 110 and destination devices 150A-C are all devices that are registered with the same user or online account. Thus, after a user purchases a device, the user may register the device with push server 130 or another entity that is associated with push server 130. Once it is determined that the same user has registered multiple devices (or that multiple devices are registered with the same account, which may be associated with multiple users), push server 130 stores data that associates all the registered devices with each other.

Thus, a user of a source device may not be required to specify, for each file transmitted to push server 130, which destination device(s) is to receive the file. Instead, push server 130 is configured to determine which destination devices are to receive the file (e.g., based on information previously provided from a user) and ensures that the file is sent to the appropriate destination devices.

Latecomer Destination Devices

As explained above, files are automatically pushed from source device 110 to the destination devices 150A-C with which source device 110 is associated. After the files have been pushed from source device 110 to destination devices 150A-C in this manner, it is possible to add an additional destination device to those with which source device 110 is associated.

This situation may occur, for example, when a user purchases and registers another computing device with an account that is already associated with source device 110 and destination devices 150A-C. Thus, a newly registered device may receive all files that have ever been uploaded from any one of source device 110 and destination devices 150A-C, or all files that have been uploaded during a certain period of time (e.g., the last 30 days).

This situation may also occur when the user adds a new "friend" in a social network, and the friend specifies that she desires to receive files pushed from the owner of source device 110. Under these circumstances, push server 130 may push to the device(s) of the new friend all files that have been pushed by source device 110, or all files that have been pushed by push device 110 within a particular time period.

Destination Device Selection Criteria

In an embodiment, device association data 210 indicates, for a given source device, multiple different sets of destination devices. For example, device association data 210 indicates (1) that source device 110 is associated with destination devices 150A-C for all image files and (2) that source device 110 is associated with destination devices 150A and 150B (but not destination device 150C) for all other types of files. In order to identify the appropriate set of destination devices, push server 130 uses destination device selection criteria 220 (or simply "selection criteria 220"). Non-limiting examples of selection criteria 220 include:

a time (such as when source device 110 notifies push server 130 of a file or when the file was created),
 the type of file,
 an author or creator of the file,
 content of the file, and
 other data, such as an explicit indication that is sent from source device 110 and that is associated with the transmission from source device 110 of (a) the file or (b) a notification of the file.

An example of an explicit indication is device identification data that is included in a transmission from source device 110, where the device identification data identifies (either directly or indirectly) destination device 150A and 150C (but not destination device 150B).

Thus, the time, type, author, or content of a particular file may be used to dictate to which set of destination devices the particular file is to be pushed. As a further example, any file transmitted from source device 110 after 10 PM and before 5 AM is to be transmitted to destination devices 150A and 150B while any file created by George Smith is to be transmitted to destination device 150A.

Selection criteria 220 may or may not be stored as part of device association data 210. For example, selection criteria 220 may be stored in another field for each entry in device association data 210. As another example, selection criteria 220 may be stored in the source device field of each entry in device association data 210. Thus, while multiple entries may exist for source device 110, each entry may include a different set of selection criteria.

Similar to device association data 210, selection criteria 220 may be established by a user operating any one of source device 110 or destination devices 150A-C (or other device).

Pending Files

Files that are stored by third-party storage service 140 (or by push server 130) and that have not yet been transmitted to all of their respective destination devices are referred to herein as "pending files" with respect to those destination devices to which they have not yet been pushed. For example, files A and B are stored at third-party storage service 140, destination device 150A has retrieved files A and B from third-party storage service 140, destination device 150B has retrieved file A but not file B from third-party storage service 140, and destination device 150C has not yet retrieved either of files A or B from third-party storage service 140. Therefore, file A is considered a "pending file" with respect to destination device 150C and file B is considered a "pending file" with respect to destination devices 150B and 150C.

One reason that a destination device may not have been notified of a pending file for a period of time is because the destination device may not have a certain type of connection with push server 130. Therefore, there may be no way (at least during that period of time) for push server 130 to notify the destination device of one or more pending files for that destination device. Once the connection is reestablished between push server 130 and the destination device, push server 130 is configured to send, to the destination device, a notification that destination device should query push server 130 in order to discover one or more files that are remotely stored relative to the destination device and destined for that destination device.

File Retrieval Data

In order to ensure that pending files are transmitted to the appropriate destination devices, push server 130 maintains data about pending files in file retrieval data 230, depicted in FIG. 2. File retrieval data 230 associates one or more pending files with one or more destination devices. File retrieval data 230 may include information on a per-destination device basis. For example, file retrieval data 230 may include an entry that associates destination device 150A with files A and B. The existence of that entry in file retrieval data 230 indicates that destination device 150A has not yet been notified of (or retrieved) files A and B. As a further example, file retrieval data 230 may include another entry that associates destination device 150B with files A and C. The existence of that entry in file retrieval data 230 indicates that destination device 150B has not been notified of (or retrieved) files A and C.

Push server 130 may create a new entry (or record) in file retrieval data 230 in response to push server 130 (1) receiving an indication from source device 110 that source device 110 stores a particular file and (2) identifying the one or more destination devices that are to receive the particular file (e.g., using device association data 210). In addition to associating one or more pending files with one or more destination devices, push server 130 may also associate file storage location data with the one or more pending files. When push server 130 notifies the one or more destination devices about the one or more pending files, the notification includes the file storage location data, which may identify third-party storage service 140. The notification may comprise a URL that is associated with third-party storage service 140 and that includes file identification data that third-party storage service 140 uses to identify the one or more files. In this approach, third-party storage service 140 maintains a file ID-to-storage location mapping. Third-party storage service 140 uses the file identification data to identify the appropriate mapping, retrieves the one or more files from the corresponding location(s), and sends the one or more files to the requesting destination device.

Additionally or alternatively, file retrieval data 230 may include information on a per-source basis. For example, each source device may be associated with a "source" table that has two columns: a file identifier column and a timestamp column. Push server 130 adds a row to the source table for each file received from the source device that corresponds to the table. Push server 130 updates the row to indicate an identifier for the received file and a timestamp of when the file was received. When a destination device sends, to push server 130, a request for information about one or more files, push server 130 determines which source device(s) are associated with the destination device and analyzes the request for a "last-seen" timestamp. The last-seen timestamp is used to identify, in the source table, each file that is associated with a timestamp that is greater than the last-seen timestamp.

In the embodiment where file retrieval data 230 includes information on a per-source basis, push server 130 may maintain a destination-to-source mapping that associates a destination device with all possible source devices. The destination-to-source mapping is used to determine, for a particular destination device, which source tables should be analyzed to determine which files should be sent to the particular destination device.

A source table may also include an expiration column that indicates when the corresponding file is to be deleted from third-party storage server 140, or at least when a destination device that has not yet received the corresponding file is no longer able to receive the corresponding file. When the time indicated by an entry in the expiration column equals the current time, the source table may be updated to remove or delete the corresponding row from the source table.

In some scenarios, a destination device may be subscribed to receive files from source device 110 in some situations but not in other situations. For example, destination device 150B is to receive all image files from source device 110 but not any non-image files. Thus, when source device 110 notifies push server 130 of a non-image file, push server 130 needs to ensure that destination device 150 does not receive the non-image file. Thus, in an embodiment, the table may include a "should receive" column for each destination device that might receive a file from source device 110. The "should receive" column indicates whether a destination device should receive the corresponding file. Thus, when a destination device requests information about one or more files, push server 130 determines which source device(s) are associated with the destination device and analyzes the "should receive" column to determine whether the destination device should receive the corresponding file. If the "last-seen" timestamp of the destination device is less than the timestamp of the corresponding file and the "should receive" column indicates that the destination device should receive the corresponding file, then push server 130 sends information about the corresponding file to the destination device.

Push Process

Figure 3A:
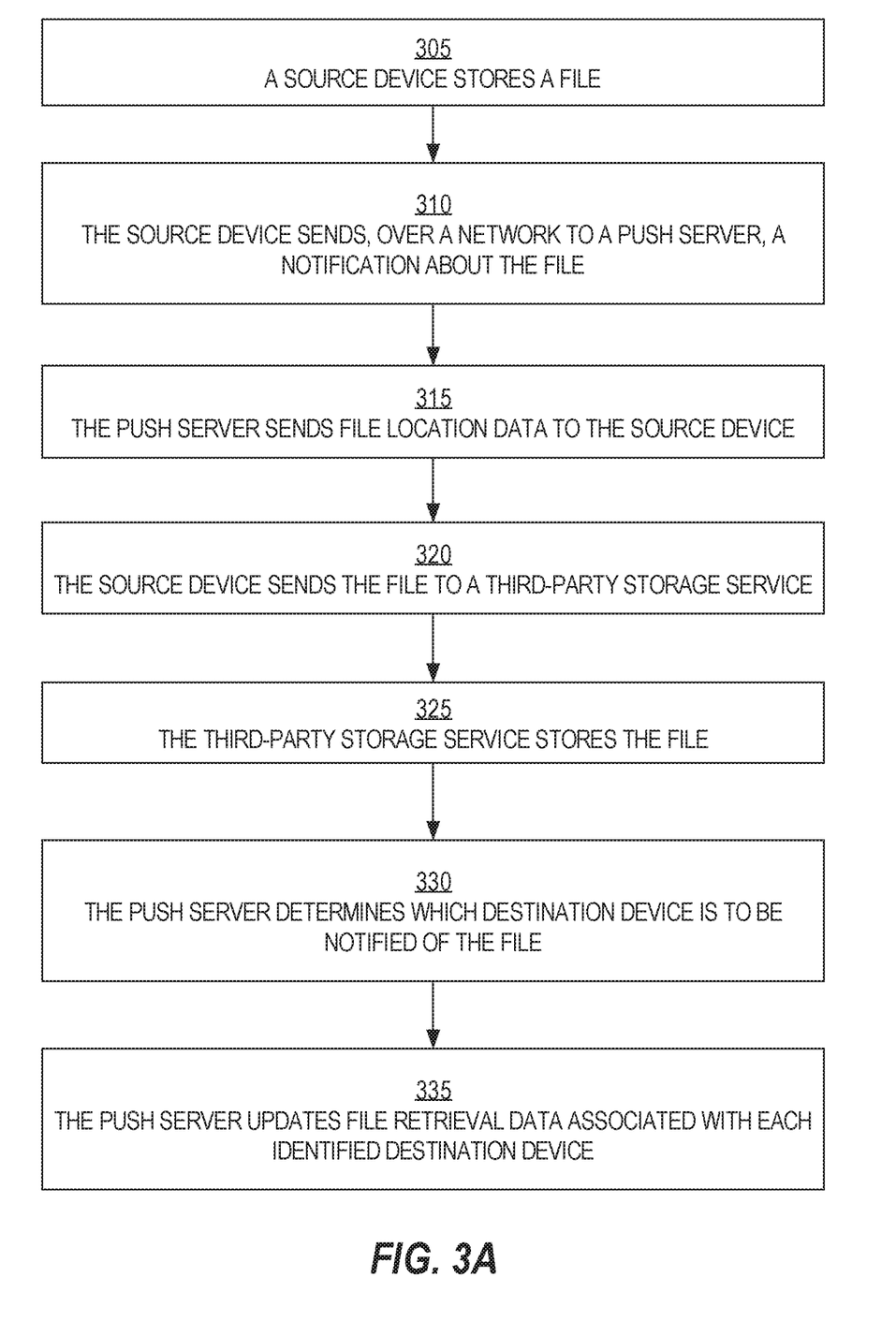
FIGS. 3A-B depict a process for causing a file to be sent from a source device to one or more other destination devices over a network, according to an embodiment of the invention.
Figure 3B:
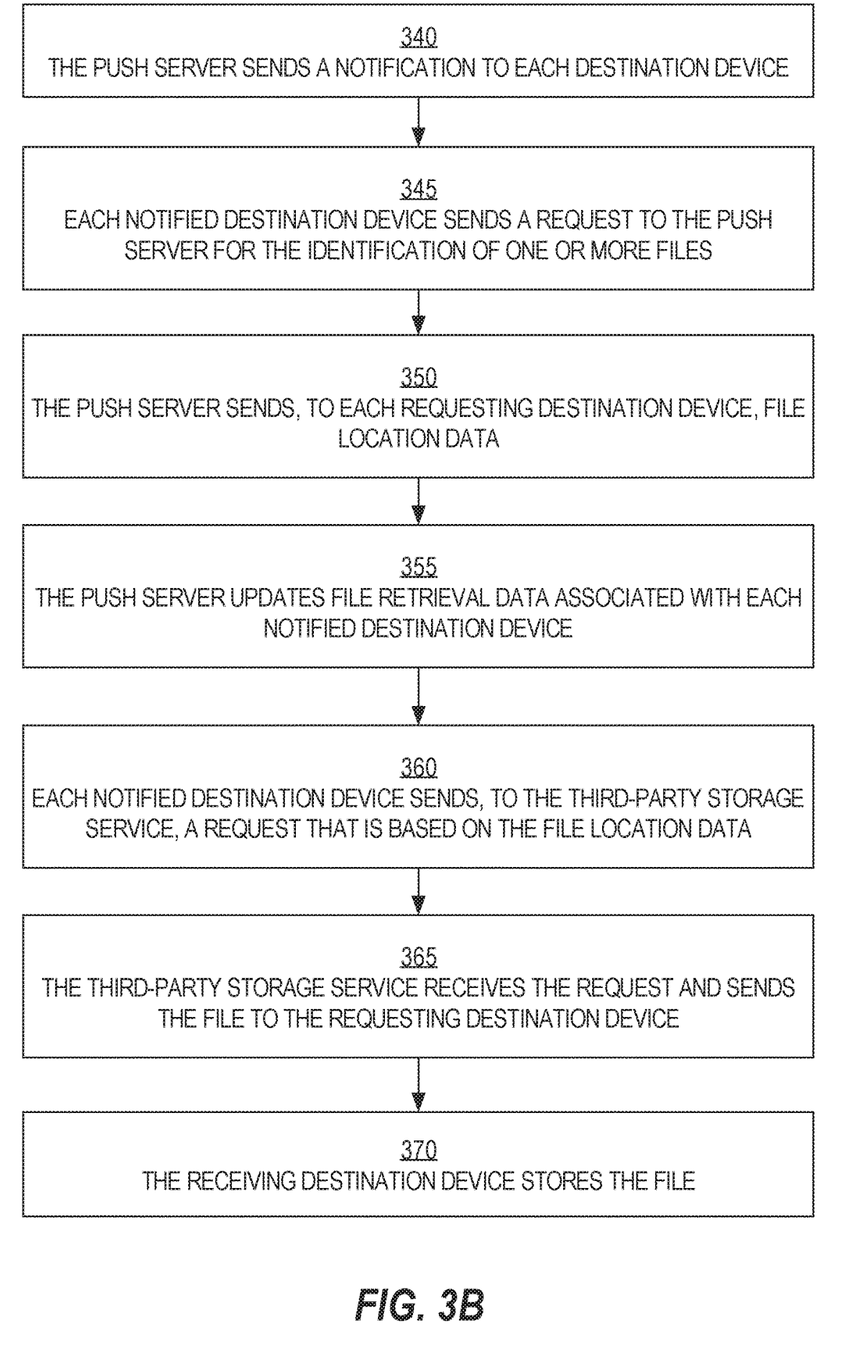

FIGS. 3A-B depict a process 300 for pushing a file from source device 110 to destination devices 150A-C using push server 130, according to an embodiment of the invention.

At step 305, source device 110 stores a particular file. Source device 110 may have created the particular file. Alternatively, source device 110 may receive the particular file from another device, such as a camera or another computing device, such as a smart phone, laptop, or tablet. As yet another example, the step 305 may be triggered by the user moving the particular file from one location to another on source device 110, or by tagging the particular file with a particular tag.

At step 310, source device 110 sends, over network 120 to push server 130, an indication that source device 110 has a file to be automatically pushed to one or more other devices. The indication is sent in response to detecting the message-triggering event, but may not occur immediately after the message-triggering event. For example, if source device 110 is offline when message-triggering events occur, then step 310 may occur the next time that source device 110 connects to network 120.

In some embodiments, the indication that is sent by source device 110 in step 310 may include the particular file. However, the following description of process 300 is of an embodiment where the particular file is not sent from source device 110 to push server 130; instead, the particular file is sent from source device 110 to third-party storage service 140.

The indication sent in step 310 may include identification data that identifies the particular file. Alternatively, push server 130 creates an identifier for the particular file. The identifier for the particular file may be based on one or more criteria, such as the particular file's name, an identity (e.g., name) of source device 110, date and time the particular file was created, and/or date and time the notification was received at push server 130. The identifier for the particular file may be unique relative to all files transmitted from source device 110 or relative to all files about which push server 130 is notified from all source devices.

The creation (or storage) of the particular file at source device 110 may trigger the performance of step 310. For example, a user takes a digital image using a smart phone that includes a camera. Software executing on the smart phone detects that the digital image was created and causes step 310 to be performed.

Another possible trigger for the performance of step 310 is the establishment of a connection between source device 110 and push server 130. For example, source device 110 may be a Wi-Fi enabled smart phone that is not in range of a Wi-Fi signal when a picture is taken with the smart phone. When the smart phone is in range and the connection is strong enough to send a message using Wi-Fi capability, a process executing on the smart phone initiates step 310. As a similar example, the smart phone may wait until the smart phone is in range of a signal from a cell phone network before performing step 310.

Another possible trigger for the performance of step 310 is the storing of the file in a particular folder, library, or storage location on source device 110. A user of source device 110 may have designated to share all files that are stored in a particular folder with other devices that are associated with source device 110, such as destination devices 150A-C. Thus, in response to a file being stored in that folder, source device 110 sends a notification of the file to push server 130.

At step 315, push server 130 sends, to source device 110, file location data that indicates where source device 110 should send the particular file. The file location data may be a Uniform Resource Locator (URL) that includes data that third-party storage service 140 uses to associate the particular file with a storage location in storage maintained by third-party storage service 140. Later, when third-party storage service 140 receives, from, for example, destination device 150B, a request that includes data that identifies the particular file, third-party storage service 140 uses that data to identify the particular file in storage and then transmits the particular file to destination device 150B.

At step 320, source device 110 sends the particular file to the location identified in the file location data. For example, if the file location data from push server 130 includes a URL, then source device 110 may send an HTTP POST request that includes the URL, the particular file, and identification data that identifies the particular file.

At step 325, third-party storage service 140 stores the particular file and maintains a mapping that maps (1) identification data (such as is sent in step 320) that identifies the particular file with (2) a location in persistent storage maintained by third-party storage service 140.

At step 330, push server 130 determines which destination device is to be notified of the particular file. If source device 110 is associated with multiple sets of destination devices, then push server 130 analyzes selection criteria 220 associated with source device 110 to determine the appropriate set of one or more destination devices indicated in device association data 210.

At step 335, push server 130 stores data that indicates which files need to go to which destination devices. This step may be performed by updating file retrieval data associated with each destination device identified in step 330 to reflect that that destination device has not yet received (or been notified of) the particular file identified in step 310. For example, if push server 130 determines that destination devices 150A-C are to be notified of the particular file, then push server 130 updates (or creates a new entry in) file retrieval data associated with each of destination devices 150A-C to indicate that the destination devices have not yet been notified of the particular file. If an entry already exists in file retrieval data 230 for each of one or more of destination devices 150A-C, then that entry may be updated to include data about the particular file, such as an identifier that uniquely identifies the particular file.

At step 340, push server 130 sends, to each destination device identified in step 330, a notification that one or more files are ready for retrieval by the destination device. For example, if destinations device 150A-C are identified in step 330, then each of destination devices 150A-C receives the notification. The notification may or may not contain information about the specifics of file(s) to the retrieved, such as file name, type, size, or source of the file(s). If the notification includes data about the file(s) to be retrieved, then the notification may include file location data that indicates where the one or more files are located. The notification may include a URL that contains data that identifies, to third-party storage service 140, the particular file to be retrieved. The data may comprise one or more values that uniquely identify the particular file relative to other files stored by third party storage service 140.

The notification in step 340 may be sent to a destination device only after it is determined that a certain type of connection is established between push server 130 and the destination device. For example, if there is no connection between push server 130 and destination device 150B, then push server 130 waits until a connection is re-established with destination device 150B before sending the notification to destination device 150B. While there is no connection between destination device 150B and push server 130, push server 130 may have received numerous notifications from source device 110 (and/or other source devices) about files that are to be transmitted to destination device 150B. In response to those notifications, push server 130 updates file retrieval data 230 associated with destination device 150B to reflect those files that are destined for destination device 150B. For example, push server 130 creates numerous entries that each identify one or more files and associates those entries with destination device 150B. As another example, push server 130 adds, to a single entry in file retrieval data 230, data that identifies all those files.

Another factor in determining whether a notification is to be sent to a particular destination device may be the workload on push server 130. For example, push server 130 may be busy processing indications/notifications from source devices and communicating with other destination devices. The connection bandwidth, current workload, and/or other factors may be taken into account to determine when to notify the particular destination device. For example, if the overall connection bandwidth of push server 130 falls below a particular threshold, then push server 130 will send a notification to the particular destination device.

Additionally or alternatively, users of destination devices may establish one or more parameters that dictate when push server 130 is allowed to push. For example, a user may specify that all push notifications are to occur during a certain time of the day (e.g., between 2 AM and 5 AM), when usage of his/her destination device is below a particular threshold (e.g., 50% CPU), or when the destination device remains idle for more than a certain period of time (e.g., 30 minutes).

At step 345, if the notification sent in step 340 does not include any data that can be used to identify the particular file to third-party storage service 140, then each destination device notified in step 340 sends, to push server 130, a request for the identification of files that are to be transmitted to the destination device.

At step 350, in response to the request received in step 345, push server 130 sends, to the requesting destination device, file location data that indicates where the requesting destination device can retrieve the particular file. The file location data may include data that identifies the particular file and any other files that are to be transmitted to the requesting destination device. The file location data may include a URL that is associated with (or identifies) third-party storage service 140 and that the requesting destination device uses to retrieve the particular file. Step 350 may comprise push server 130 using the identity of the requesting destination device to look up the appropriate entry or entries in file retrieval data 230 to identify data that identifies the particular file and any other files that are to be transmitted to the requesting destination device.

At step 355, push server 130 updates the file retrieval data associated with a destination device to indicate that that destination device has been notified of one or more files (including the particular file). This update may comprise deleting, in an entry associated with the destination device, data that identifies the one or more files. An update of file retrieval data 230 in this step may be performed in response to push server 130 sending (a) the notification in step 340 or (b) the identification data in step 350. Alternatively, push server 130 updates the file retrieval data associated with a destination device in response to receiving (e.g., from the destination device) data that indicates that that destination device actually received (a) the notification sent in step 340 or (b) the identification data in step 350. Alternatively, push server 130 updates the file retrieval data associated with a destination device in response to receiving (e.g., from third-party storage service 140 or from the destination device) data that indicates that the one or more files were successfully received by the destination device. The file retrieval data associated with any other destination devices that have not yet received or been notified of the particular file remain unchanged, at least with respect to the particular file.

In a related embodiment, push server 130 updates file retrieval data associated with a destination device each time push server 130 determines that certain actions have been performed with respect to a pending file for the destination device. For example, push server 130 creates an entry (or record) in file retrieval data 230, which entry is associated with destination device 150B. The entry indicates that push server 130 has not yet notified destination device 150B of file A. Later, push server 130 updates the entry to indicate that push server 130 has sent a notification to destination device 150B of file A. Later, push server 130 updates the entry to indicate that destination device 150B received the notification. Later, push server 130 updates the entry to indicate that destination device 150B sent, to third-party storage service 140, a request for file A. Later, push server 130 updates the entry to indicate that third-party storage service 140 sent file A to destination device 150B. Later, push server 130 updates the entry to indicate that destination device 150B received file A. Later, push server 130 may delete the entry.

At step 360, each notified destination device uses the file location data to formulate and send, to third-party storage service 140, a request for the file (or files). The request may be, for example, an HTTP GET request that includes a URL that includes identification data that is used by third-party storage service 140 to identify the file(s).

At step 365, third-party storage service 140, in response to receiving the request from a destination device, identifies one or more files (including the particular file) indicated in the request and sends the one or more files to the destination device.

At step 370, each destination device that receives the particular file stores the particular file, e.g., in a particular library of files that are accessible to an application that is configured to process the particular file. For example, if the particular file is a digital image, the digital image may be stored in a library of images that are accessible to a photo management application that is installed on the destination device. The photo management application may or may not be executing on the destination device when the digital image is stored in the library of digital images.

In an embodiment, a process executing on a destination device that receives the particular file (e.g., an application that is configured to process the particular file) may cause a message to be displayed on the destination device that indicates that a file has recently been received at the destination device. Such a message allows a user of the destination device to immediately know that a new file has been added to the destination device. The message may be displayed for a brief period of time, such as two seconds so as not to significantly distract the user of the destination device from her current task. The message may comprise a name of the particular file and/or an image of the particular file. For example, if the particular file is a digital image, then the message may include a thumbnail image of the digital image and a name of the digital image. As another example, if the particular file is a video file, then the message may include thumbnail image of a frame from the video file. As another example, if the particular file is a PDF file, then the message may include a thumbnail image of a page from the PDF file.

In an embodiment, a process executing on a destination device that receives the particular file from third-party storage service 140 analyzes the particular file to determine where on the destination device to store the particular file. The determination may be based on the particular file's type (e.g., image, video, or text). For example, if the particular file is an image file, then the process stores the image file in a library of digital images, to which a photo management application is configured to access. If the particular file is a video file, then the process stores the video file is a library to video files, to which a video management application is configured to access.

Embodiments of the invention are not limited to the exact steps or the order of the steps depicted in FIG. 3. For example, step 340 is optional if one or more of destination devices 150A-C are configured to regularly poll push server 130 for pending files. As another example, steps 330 and 335 may occur before step 325 or even step 320.

Temporary Storage of Files

In an embodiment, files from source device 110 are stored by third-party storage service 140 (or push server 130) for a limited period of time, after which the files are deleted and, thus, no longer accessible to destination devices 150A-C, even if one or more of destination devices 150A-C (i.e., that are supposed to receive those files) have not yet received the files. In other words, after the period of time has elapsed, a destination device that has not yet retrieved a file will not be able to retrieve the file, even if the destination device sends an appropriate request to third-party storage service 140 (or push server 130).

The period of time may vary from one file to another depending on one or more deletion criteria. For example, the period of time for one file from source device 110 may be 30 days while the period of time associated with another file (from source device 110 or another source device) may be 10 days. Non-limiting examples of deletion criteria include the type of file, the creator of the file, the size of the file, people identified in an image of an image file, the particular source device, and the devices indicated in the device association data associated with the file. For example, all pending image files transmitted from source device 110 are deleted after 30 days of storage. As another example, all pending non-images files transmitted from source device 110 are not deleted (i.e., there is no period of time after which any non-image file is deleted). In other words, non-image files are stored indefinitely, but the image files become inaccessible to destination devices after a certain period of time. As another example, all pending files transmitted from one source device are deleted after 20 days while all pending files transmitted from another source device are deleted after 30 days. As another example, all pending files for destination device 150A are deleted after 20 days while all pending files for destination device 150B are deleted after 5 days.

After a period of time has elapsed since a file has been stored at third-party storage service 140, third-party storage service 140 may be configured to automatically delete the file. The period of time may be "preset" at third-party storage service 140 (i.e., before the file is received at service 140) or may be, for example, indicated in data that accompanies the transmission of the file from source device 110. Thus, the period of time associated with a file may be established by push server 130 or source device 110 and enforced by third-party storage service 140. For example, push server 130 may send deletion time data to third-party storage service 140, which determines, based on the deletion time data, when to delete the particular file. Alternatively, push server 130 sends an instruction to third-party storage service 140 to indicate that service 140 may delete the file immediately. In this way, third-party storage service 140 is not required to keep track of when files should be deleted (or otherwise rendered inaccessible to destination devices).

In an embodiment, push server 130 stores deletion time data for one or more files that are stored by third-party storage service 140. Deletion time data indicates, for each of the one or more files, when the file is no longer accessible to a destination device. The deletion time data may be stored in file retrieval data 230 that is associated with destination devices 150A-C. For example, each entry of one or more entries in file retrieval data 230 indicates a pending file for a particular destination device. An entry may also include deletion time data, which may be a date and, optionally, a time at which the corresponding file is to be made inaccessible (e.g., deleted).

In an embodiment, push server 130 sends a notification to a source device if a destination device has not yet received a pending file, i.e., for that destination device. For example, push server 130 analyzes deletion time data in file retrieval data 230 to determine if the period of time associated with the corresponding file is about to lapse (e.g., in the next 1-2 days). If so, then push server 130 notifies source device 110 (the originator of the file) that the file has not been received by a destination device. (To assist in the identification of the source device, file retrieval data 230 may include source device data that indicates, for a pending file, which source device transmitted the pending file.) The user of source device 110 may determine, for example, that the user needs to turn the destination device on or moved to a location with a Wi-Fi or cellular signal, which may cause a connection to be established between the destination device and push server 130. After the connection is established, the destination device sends, to push server 130, a request for information about file(s) to receive. The request may be sent in response to a message from push server 130 to check in with push server 130 regarding one or more pending files for the destination device.

As indicated above, device association data 110 may be modified to indicate another destination device. For example, a user that owns source device 110 and destination devices 150A-C purchases another destination device and registers the destination device with the user's account. The registration of the new destination device causes the device association data 110 to be updated to reflect that source device 110, destination devices 150A-C, and the new destination device are all associated with each other. If destination devices 150-A-C have been notified by push server 130 about a pending file, then the new destination device may be notified of the pending file. For example, if pending file A is accessible to destination devices 150A-C for 30 days and the new destination device is added to the association on day 5 into that 30 day period, then pending file A is accessible to the new destination device for 25 days. Push server 130 may notify the new destination device of pending file A, e.g., as soon as device association data 210 is updated to reflect the updated association.

Pushing Based on an Attribute of the File

In an embodiment, one or more attributes of a file are used to determine to which destination device(s) the file is to be sent. An attribute of a file is an example of destination device selection criteria 220. Additionally, other destination device selection criteria 220 may be used to determine a particular set of destination devices, while one or more attributes of a file (including content of the file) may be used to identify a strict subset of that particular set of destination devices.

Non-limiting examples of attributes of a file include the file's type, the size of the file, where the file was created (e.g., geographical location of where a picture was taken/created), whether the file contains specified data (e.g., the file is a text file that includes the word "Geronimo"), whether an image of a particular person or object was detected and recognized in the file (if, for example, the file is an image file).

For example, any image files sent from source device 110 are only to be sent to destination device 150A and destination device 150C, while any video files sent from source device 110 are only to be sent to destination device 150A. As another example, image files in which an image of "Grandma Jane" was detected are sent only to destination device 150B, while all other files are sent to each of destination devices 150A-C.

As another example, source device 110 obtains a first photo of person A's face and of person B's face. In response to being notified of the first photo, push server 130 causes the first photo to be pushed to person A's device and to person B's device. Later, source device 110 obtains a second photo of person B's face and of person C's face. In response to being notified of the second photo, push server 130 causes the second photo to be pushed to person B's device and to person C's device.

In an embodiment, many source devices may be configured to send certain photos to a particular storage location. For example, the camera phones of mothers of boys of a baseball team are configured to automatically push photos taken at a particular baseball field to a storage location associated with the team's website. Thus, any photos taken by the camera phones at the particular baseball field are pushed to third-party storage service 140 and eventually pushed to the storage location. In this way, any users accessing the team's website after the photos are taken may view the photos.

As another example, George throws a party and has an ongoing slideshow on a large display at the site of the party. George informs every party attendant about the identity of a particular device that is hooked up to the display. All photos taken in the vicinity of the location of the party during the time of the party are pushed to the particular device and automatically added to the ongoing slideshow at the party.

The one or more attributes may be indicated in attribute data that is sent from source device 110 to push server 130, for example, as part of a notification of a file (see step 310 of FIG. 3). For example, the notification from source device 110 to push server 130 may indicate the file's type, the file's size, and/or an identity of a person whose image is detected in the file. Alternatively, if push server 130 receives the file, push server 130 may analyze the file to determine one or more attributes of the file. In either scenario, push server 130 uses the one or more attributes to determine a set of one or more destination devices that are to be notified of the file.

Pushing Versions of Files

In an embodiment, source device 110 sends two versions of a file to third-party storage service 140 (or push server 130). For example, one version of an image file from source device 110 has a first resolution and another version of that image file has a second resolution that is lower than the first resolution. As another example, a word processing file from source device 110 is in a first format (e.g., .doc) and a version of that file is in a second format (e.g., .txt) that is different than the first format. Push server 130 identifies destination devices 150A-C as being targets of one or both of the versions. Thus, destination device 150A may receive one version of a file and destination devices 150B and 150C may receive the other version of the file.

Causing one version of a file to be sent to one destination device and another version of the file to be sent to another destination device allows versions to be sent to appropriate devices, depending on, for example, the capabilities of the destination device. For example, destination device 150A may be a laptop computer with a relatively large display screen (e.g., 18" screen) while destination device 150B may be a smart phone that has a relatively small display screen (e.g., 4" screen). A lower resolution version of an image is better suited to the smaller screen size of the smart phone than a higher resolution version of the image.

In an embodiment, source device 110 generates a second version of a file (the file being the "first version"). Source device 110 may send, over network 200, only the first version of the file or both the second version and the first version. Alternatively, another entity, such as push server 130, generates the second version from the first version of the file.

In an embodiment, push server 130 determines which destination device is to receive the version based on version data associated with the destination devices. The version data indicates, for one or more destination devices, which destination device is to receive a particular version of a file. For example, version data associated with destination device 150A indicates that destination device 150A is to receive a high resolution image sent from source device 110 while version data associated with destination device 150B indicates that destination device 150B is to receive a lower resolution version of the image.

Pushing Photos to an Ongoing Slideshow

In an embodiment, one of destination devices 150A-C is a device that displays a slideshow of images when that device retrieves an image file from third-party storage service 140 (or from push server 130). In response to receiving the image file, the destination device updates the slideshow to include the image file in the slideshow. For example, destination device 150A is displaying a different digital image from a slideshow of 100 digital images every 3 seconds when destination device 150A receives a notification from push server 130 about one or more files.

While displaying the slideshow, destination device 150A (1) sends, to third-party storage service 140, a request for the one or more files, (2) receives the one or more files from third-party storage service 140, and (3) updates the slideshow to include a digital image from the one or more files.

Destination device 150A may be configured to cause the digital image to be displayed as soon as destination device 150A receives the digital image. Alternatively, destination device 150A may be configured to include the digital image at a certain position in the display order of the other digital images in the slideshow. The display order may be based on a timestamp associated with each digital image or some other criteria, such as the source device, or a geographic location of the content in the digital image or some other characteristic of the content in the digital image.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
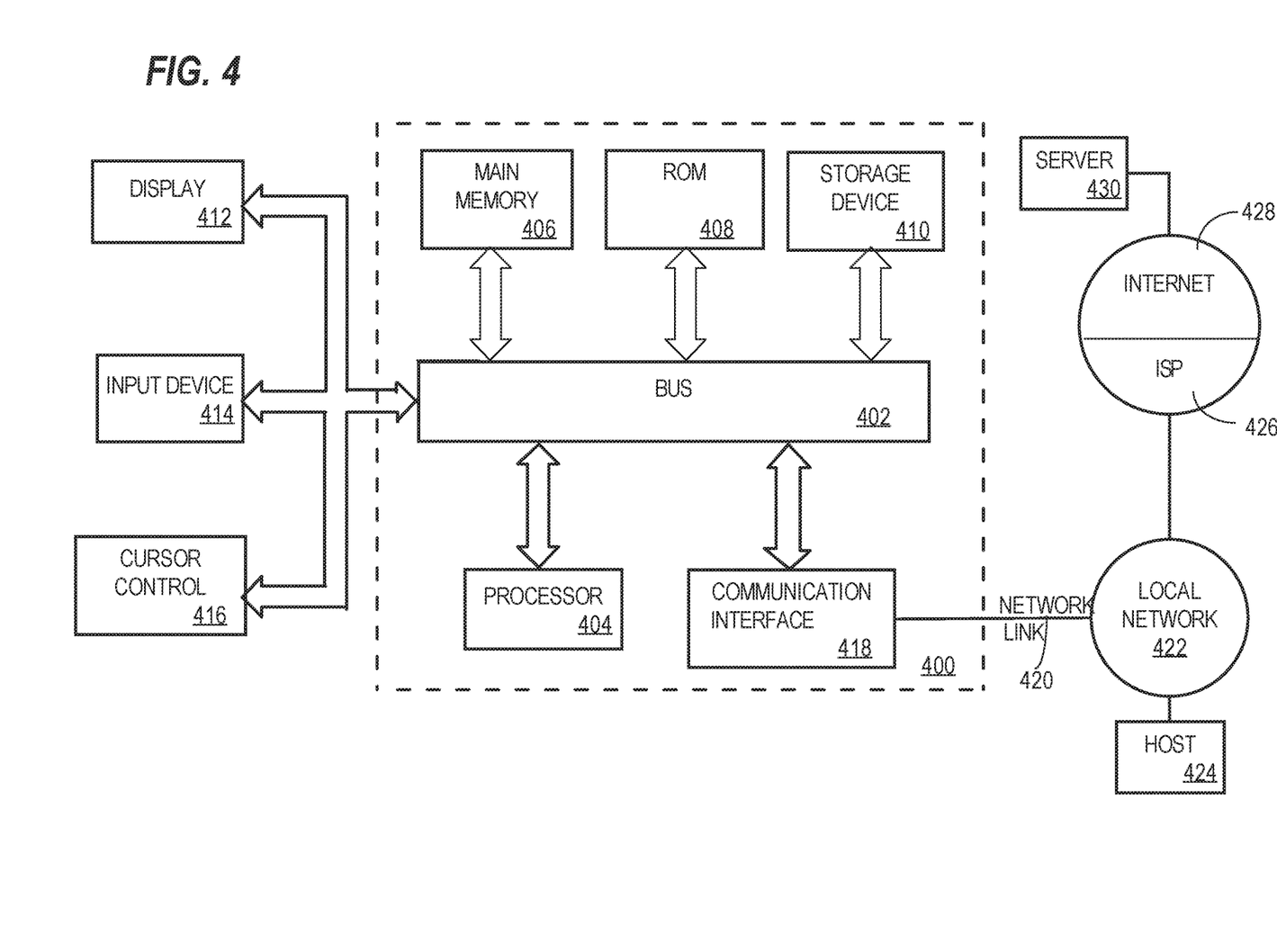
FIG. 4 is a block diagram that illustrates a computer system 400 upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, by a first entity, association data that indicates source information, destination information, and a relationship between the source information and the destination information, wherein the destination information identifies a second device of a plurality of devices;
   receiving an indication, by the first entity, over a network from a first device of the plurality of devices, wherein the indication indicates that a file stored on the first device is to be sent to another device of the plurality of devices;
   sending, by the first entity, a first address to the first device over the network in response to the indication, wherein the first address indicates a second entity to send the file to, and wherein the second entity is different from the first entity;
   identifying, by the first entity, the second device based on the association data, wherein the second device is different from the first device; and
   sending, by the first entity, a second address to the second device over the network, wherein the second address indicates the second entity from which to retrieve the file.

2. The method of claim 1, wherein the first address includes identification data that identifies the file.

3. The method of claim 1, wherein the first entity comprises a synchronization server.

4. The method of claim 1, wherein sending the second address is performed in response to the first entity receiving, from the second device, a request for information about one or more files.

5. The method of claim 1, wherein identifying the second device is based at least in part on failure of a communicative connection between the first entity and the second device.

6. The method of claim 5, wherein sending the second address is based at least in part on a successful communicative connection between the first entity and the second device.

7. The method of claim 1, further comprising receiving, from the first device, the file by the second entity in response to the first device receiving the first address.

8. The method of claim 7, further comprising sending, from the second entity, the file to the second device in response to the second device receiving the second address.

9. One or more non-transitory storage media storing instructions which, when executed by one or more processors, cause the one or more processors to:
   store, by a first entity, association data that indicates source information, destination information, and a relationship between the source information and the destination information, wherein the destination information identifies a second device of a plurality of devices;
   receive an indication, by the first entity, over a network from a first device of the plurality of devices, wherein the indication indicates that a file stored on the first device is to be sent to another device of the plurality of devices;
   send, by the first entity, a first address to the first device over the network in response to the indication, wherein the first address indicates a second entity to send the file to, and wherein the second entity is different from the first entity;
   identify, by the first entity, the second device based on the association data, wherein the second device is different from the first device; and
   send, by the first entity, a second address to the second device over the network, wherein the second address indicates the second entity from which to retrieve the file.

10. The one or more non-transitory storage media of claim 9, wherein the first address includes identification data that identifies the file.

11. The one or more non-transitory storage media of claim 9, wherein the first entity comprises a synchronization server.

12. The one or more non-transitory storage media of claim 9, wherein the one or more storage media store further instructions which, when executed by the one or more processors, further cause the one or more processors to send the second address in response to the first entity receiving, from the second device, a request for information about one or more files.

13. The one or more non-transitory storage media of claim 9, wherein the instructions that cause the one or more processors to identify the second device comprise instructions that cause the one or more processors to identify the second device based at least in part on failure of a communicative connection between the first entity and the second device.

14. The one or more non-transitory storage media of claim 13, wherein the instructions that cause the one or more processors to send the second address comprise instructions that cause the one or more processors to send the second address based at least in part on a successful communicative connection between the first entity and the second device.

15. A system comprising:
one or more non-transitory storage media storing instructions; and
one or more computing devices, programmed to perform the instructions, wherein performance of the instructions causes the one or more computing devices to:
store, by a first entity, association data that indicates source information, destination information, and a relationship between the source information and the destination information, wherein the destination information identifies a second device of a plurality of devices;
receive an indication, by the first entity, over a network from a first device of the plurality of devices, wherein the indication indicates that a file stored on the first device is to be sent to another device of the plurality of devices;
send, by the first entity, a first address to the first device over the network in response to the indication, wherein the first address indicates a second entity to send the file to, and wherein the second entity is different from the first entity;
identify, by the first entity, the second device based on the association data, wherein the second device is different from the first device; and
send, by the first entity, a second address to the second device over the network, wherein the second address indicates the second entity from which to retrieve the file.

16. The system of claim 15, wherein the first address includes identification data that identifies the file.

17. The system of claim 15, wherein the one or more computing devices are further programmed to perform further instructions, wherein performance of the further instructions further causes the one or more computing devices to send the second address in response to the first entity receiving, from the second device, a request for information about one or more files.

18. The system of claim 15, wherein the instructions that cause the one or more computing devices to identify the second device comprise instructions that cause the one or more computing devices to identify the second device based at least in part on failure of a communicative connection between the first entity and the second device.

19. The system of claim 18, wherein the instructions that cause the one or more computing devices to send the second address comprise instructions that cause the one or more computing devices to send the second address based at least in part on a successful communicative connection between the first entity and the second device succeeds.

* * * * *